US012654139B2

(12) United States Patent
Chenal et al.

(10) Patent No.: US 12,654,139 B2
(45) Date of Patent: Jun. 16, 2026

(54) METHOD FOR IMPROVING THE AIRTIGHTNESS OF BUILDINGS USING A BIOPOLYMER-BASED MEMBRANE

(71) Applicant: SAINT-GOBAIN ISOVER, Courbevoie (FR)

(72) Inventors: Marion Chenal, Montreuil (FR); Joël Azevedo, Marcq en Baroeul (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 369 days.

(21) Appl. No.: 18/260,436

(22) PCT Filed: Jan. 4, 2022

(86) PCT No.: PCT/FR2022/050009
§ 371 (c)(1),
(2) Date: Jul. 5, 2023

(87) PCT Pub. No.: WO2022/148925
PCT Pub. Date: Jul. 14, 2022

(65) Prior Publication Data
US 2024/0058766 A1    Feb. 22, 2024

(30) Foreign Application Priority Data

| Jan. 7, 2021 | (FR) | ........................................ 2100107 |
| Jan. 15, 2021 | (FR) | ........................................ 2100377 |

(51) Int. Cl.
| *B01D 69/12* | (2006.01) |
| *B01D 71/10* | (2006.01) |
| *B01D 71/30* | (2006.01) |

(52) U.S. Cl.
CPC ......... *B01D 69/1216* (2022.08); *B01D 71/10* (2013.01); *B01D 71/301* (2022.08); *B01D 2325/04* (2013.01); *B01D 2325/20* (2013.01)

(58) Field of Classification Search
None
See application file for complete search history.

(56) References Cited

U.S. PATENT DOCUMENTS

| 6,808,772 B2 | 10/2004 | Kunzel et al. |
| 6,878,455 B2 | 4/2005 | Kunzel et al. |
| 7,008,890 B1 | 3/2006 | Kunzel et al. |

FOREIGN PATENT DOCUMENTS

| FR | DR FR 2 997 649 A1 | 5/2014 | |
| WO | WO 96/33321 A1 | 10/1996 | |
| WO | WO 00/37751 A1 | 6/2000 | |
| WO | JR WO 2005/110892 A1 | 11/2005 | |
| WO | WO 2006/034381 A2 | 3/2006 | |
| WO | WO 2007/010388 A1 | 1/2007 | |
| WO | WO-2009024804 A1 * | 2/2009 | ........... C08J 7/0427 |
| WO | WO 2009/080938 A2 | 7/2009 | |
| WO | WO 2010/029266 A1 | 3/2010 | |
| WO | WO 2013/014399 A1 | 1/2013 | |
| WO | WO 2013/021112 A1 | 2/2013 | |
| WO | WO 2015/095786 A1 | 6/2015 | |
| WO | OR WO A1 2015/132518 | 9/2015 | |

OTHER PUBLICATIONS

International Search Report as issued in International Patent Application No. PCT/FR2022/050009, dated Apr. 12, 2022.
S.A., "Notes: The "Barrer" Permeability Unit," Journal of Polymer Science Part A-2, vol. 6, (Year: 1968), pp. 1933-1934.

* cited by examiner

*Primary Examiner* — Krishnan S Menon
(74) *Attorney, Agent, or Firm* — CUSHMAN PARTNERS LLC

(57) ABSTRACT

A method for improving the airtightness of a building or a room in a building, includes using a vapor barrier membrane on the inner face of the walls of the building or the room in the building, wherein the vapor barrier membrane is a humidity-regulating membrane including an active portion which includes a middle layer having a thickness of 2 $\mu$m to 200 $\mu$m, and consisting of a biopolymer having a water vapor permeability coefficient $P_1$ which increases with average relative humidity and which, when determined at 23° C. and at an average relative humidity of 25.5%, is at least 300 Barrers, and, on either side of the middle layer and in contact with the latter, two outer layers with a thickness of 100 nm to 20 $\mu$m, and consisting, independently of each other, of an organic polymer having both a water vapor permeability coefficient $P_2$.

21 Claims, No Drawings

METHOD FOR IMPROVING THE AIRTIGHTNESS OF BUILDINGS USING A BIOPOLYMER-BASED MEMBRANE

CROSS-REFERENCE TO RELATED APPLICATIONS

This application is the U.S. National Stage of PCT/FR2022/050009, filed Jan. 4, 2022, which in turn claims priority to French patent application number 2100107 filed Jan. 7, 2021 and French patent application number 2100377 filed Jan. 15, 2021. The content of these applications are incorporated herein by reference in their entireties.

The present invention relates to a method for improving the airtightness of buildings or rooms of buildings using a vapor barrier membrane, comprising a biopolymer-based hydrophilic middle layer and two relatively more hydrophobic outer layers than the middle layer.

From many years, humidity-regulating vapor membranes, the water vapor permeability of which varies according to the humidity of the air, are known. For reasons explained, for example, in application WO96/33321, it is sought to obtain membranes that allow water vapor to pass easily when relative humidity (RH) is high (70% to 100% RH) and which effectively block it at low relative humidity (50% RH and less).

Such membranes, when they are arranged on the inner face of a thermal insulation material (the face turned toward the interior of a building or room), prevent the steam from entering the interior of the building as far as possible and dry in the space between the membrane and the wall and condense on the wall (cold barrier). Conversely, at the hot season, the high permeability of the membrane allows the humidity potentially present in the structural elements of the frame to be evacuated toward the inside of the building. This property is particularly important in the case of new construction where, during installation, certain elements may have a very high water content due to their storage conditions, but also in the case of water ingress into existing structures. In both cases, it is important to be able to let the entire structure dry in an effective manner in summer, towards the outside and inside of the building. This need is crucial in particular if the elements making up the system are conducive to the proliferation of microorganisms.

Such vapor barrier membranes having differentiated behavior as a function of the relative humidity conditions surrounding it are frequently referred to as "smart vapor retarder" (SVR) membranes. In the present application, the adjectives "humidity-regulating" and "smart" are used as synonyms when they describe the variation in water vapor permeability of the vapor barrier membranes.

It is common to express the water vapor permeability of a membrane in terms of "equivalent air layer thickness" for the diffusion of water vapor ($S_d$). This thickness is expressed in meters and corresponds to the thickness of the air layer that would oppose a resistance equivalent to the diffusion of water vapor. Consequently, the greater the equivalent air layer thickness, the less permeable the membrane is to water vapor. The equivalent air layer thickness ($S_d$) can be determined in accordance with standards EN1931 and EN ISO12572.

A humidity-regulating vapor membrane is generally considered to be all the more beneficial and effective as its equivalent air layer thickness is high at low relative humidity and low at high relative humidity.

The organic vapor barrier membranes available on the market and described in the state of the art are generally based on synthetic organic polymers manufactured from petroleum monomers.

The polymers most frequently described and used are polyamides, in particular polycaprolactam, polyvinyl alcohol (PVOH), copolymers of ethylene and vinyl acetate and/or vinyl alcohol (EVA and EVOH). The most hydrophilic polymers (PVOH, EVOH) may be combined, in multilayer structures, with more hydrophobic thin layers, in particular based on polyolefins, such as polyethylene, polypropylene and ethylene and propylene copolymers.

Examples of documents describing such "smart" vapor barrier membranes are documents WO2007/010388, WO2006/034381, WO2005/110892, U.S. Pat. Nos. 7,008, 890, 6,808,772 and 6,878,455.

The purpose of the research, which resulted in the present invention, was to replace the humidity-regulating vapor barrier membranes of the prior art based on petroleum-sourced polymers, which are generally non-biodegradable, with humidity-regulating vapor membranes based on bio-sourced and/or biodegradable polymers. These biosourced and/or biodegradable polymers will be referred to hereinafter as "biopolymers". The biopolymers are preferably biosourced, i.e. based on a short-term renewable biological origin. In a particularly preferred embodiment, the biopolymers used in the membranes of the present application are both biosourced and biodegradable.

Biosourced biopolymers encompass both the natural organic polymers, present as such in biomass, the organic polymers obtained by physical and/or chemical modification of these natural polymers, and synthetic organic polymers obtained by polymerization of biosourced ingredients.

Membranes based on such biopolymers, for example based on cellulose, chitosan or based on poly (3-hydroxy-butyrate) (PHB) are known and were used, as replacements for films based on petrosourced synthetic polymers, in particular in the field of food packaging where membranes generally require water vapor permeability that is relatively independent of the humidity and temperature conditions. Furthermore, in the field of food packaging, the service life of packaging films is quite limited and generally ranges from a few days to a few weeks, at most to a few months. In the field of vapor barrier membranes, on the contrary, a long lifetime of at least several years, or even several decades, is sought.

Biopolymer-based membranes are most often rather hydrophilic. and their permeability to water vapor is high. The equivalent air layer thickness of these membranes is generally less than 1 m and its absolute value varies little with the relative humidity of the atmosphere surrounding them. These membranes therefore remain extremely permeable to water vapor regardless of the surrounding conditions.

Without wishing to be bound by any theory, it is believed that the low variation in water vapor permeability of these rather hydrophilic membranes can be attributed to the plasticizing effect of the water which "dissolves" in the membrane, even at low humidity. The higher the ambient humidity, the more the material of the membrane is plasticized by the water and the more easily the water molecules diffuse within the membrane.

The main drawback of these membranes consisting of biopolymers, for the purpose of their possible use as humidity-regulating vapor barriers, therefore lies in the fact that their permeability to water vapor remains overall too high at low relative humidity for them to be able to operate satisfactorily during the cold, dry season. A membrane consisting only of cellulose would thus not form a sufficient barrier to the water vapor coming from the inside of the building and would not prevent the water vapor from entering the space between the membrane and the wall and condensing in the insulating material and on the inner face of the outer wall.

In summary biopolymer-based hydrophilic membranes used in the field of food packaging remain too permeable to water vapor under low relative humidity (cold-season) conditions. They are therefore not "smart" enough to be able to operate properly as a vapor barrier in the field of thermal insulation of buildings, in particular to improve airtightness and the management of water vapor flows in buildings.

The present invention is based on the surprising discovery that it is possible to very significantly increase the "smartness" of biopolymer-based membranes and thus makes them compatible with use as a vapor barrier membrane in the field of construction, by applying on each of their two faces a very thin layer of hydrophobic polymer, which is not very permeable to water vapor.

This discovery was even more surprising given that the hydrophobic polymers deposited on both faces of the biopolymer membrane have a water vapor permeability which is independent of the ambient relative humidity. In other words, membranes consisting only of these hydrophobic polymers would not have any humidity-regulating nature. It was therefore impossible to provide for the deposition of these same hydrophobic polymers on the faces of a membrane made of hydrophilic biopolymer(s) greatly increased the "smartness" thereof by allowing it to have extremely low permeability to water vapor during the dry season and high permeability to water vapor during the wet season.

The object of the present application is thus a method for improving the airtightness of a building or room in a building comprising the use of a vapor barrier membrane on the inner face of the walls of the building or the room in the building, characterized in that the vapor barrier membrane is a humidity-regulating membrane comprising an active portion comprising:

a middle layer having a thickness of 2 μm to 200 μm, preferably 4 μm to 100 μm, particularly between 5 and 50 μm, and consisting of a biopolymer having a water vapor permeability coefficient $P_1$ which increases with average relative humidity and which, when determined at 23° C. and at an average relative humidity of 25.5%, is at least 300 Barrers, and, on either side of the middle layer and preferably in contact with the latter, two outer layers with a thickness of 100 nm to 20 μm, preferably 200 nm to 2.5 μm, and consisting, independently of each other, of an organic polymer having both a water vapor permeability coefficient $P_2$, determined at 23° C. and at an average relative humidity of 25.5%, of at most equal to 250 Barrers, preferably between 0.05 and 100 Barrers, in particular between 1.0 and 20 Barrers.

The active portion of the membrane is preferably a three-layer structure made up of a middle layer and two outer layers as defined above.

The middle layer and the two outer layers are of course non-perforated continuous layers. They are therefore impermeable to fluids, whether liquid or gaseous.

The permeability coefficients $P_1$ and $P_2$ are those of the polymers respectively forming the middle layer and the outer layers. They correspond to the ratio of the water vapor mass flow (Q) which passes through an area (A) of a membrane of the polymer to be tested having a given thickness (E), under the effect of a water vapor pressure difference (dP) existing on either side of the membrane.

$$P=(Q\times E)/(A\times dP)$$

They are determined according to the experimental protocol described in detail below and are expressed in "Barrers", i.e. the mass flow Q is expressed in $cm^3$ (pressure and normal temperature) per second, the thickness E is expressed in cm, the area A of the area traversed is expressed in $cm^2$, and the water vapor pressure difference (dP) is expressed in cm Hg (see in particular S. A. Stern, *Journal of Polymer Science Part A*-2, vol. 6 (1968), pages 1933-1934).

The membrane of the present invention therefore comprises a relatively thick layer based on a hydrophilic biopolymer (middle layer), coated on both faces of a continuous layer of a hydrophobic polymer (outer layers).

The two outer layers generally have a thickness smaller than that of the middle layer. The ratio of the thickness of the middle layer to the thickness of each of the outer layers is advantageously between 1.5/1 and 1000/1, preferably between 2/1 and 500/1, in particular between 3/1 and 200/1.

The two outer layers are preferably directly in contact with the middle layer, i.e., the interface between the layers is preferably free of adhesive.

In the less preferred case, where the outer layers are attached to the middle layer by means of an adhesive, the latter preferably would have a permeability coefficient $P_3$ greater than $P_1$ and $P_2$. In other words, the adhesive should not offer resistance to the diffusion of the water vapor greater than the resistance from each of the layers constituting the membrane.

The layers defined above form the "active portion" of the membranes of the present invention. This part is preferably a membrane obtained in a known manner by co-extrusion of thermoplastic polymers forming the different layers, by heat bonding of films (outer layers) on the middle layer, or by depositing a coating on both faces of the middle layer.

Although the active portion in principle has a mechanical strength allowing it to be used alone, that is to say without a support layer, it may be advantageous, in particular for active layers of small thickness (less than 50 μm), to reinforce it with a mechanical structure permeable to air and whose resistance to the diffusion of water vapor is therefore negligible compared with that of the active layer, which is impermeable to air.

In an advantageous embodiment, the vapor barrier membrane therefore further comprises an air-permeable reinforcing or protective layer, directly in contact with the active portion, that is to say with one of the outer layers. This support layer may be a grid, a perforated plate, an open-porosity foam or a woven or non-woven fabric, that is permeable to air. This is preferably an air-permeable textile, preferably a non-woven fabric. Mention may be made, as examples of support layers particularly preferred, of non-wovens made of polypropylene or polyester fibers or of fiberglass. The support layer(s) are preferably attached to the active membrane, or active layer, by bonding using a polyurethane adhesive. The present invention also encompasses membranes where a reinforcement structure, such as a grid or a non-woven, is incorporated into the active portion of the membrane and more particularly in the middle layer.

The water vapor permeability coefficient $P_2$ of the organic polymer constituting the outer layers does not vary significantly with the average relative humidity. The ratio $P_{2wet}/P_{2dry}$ generally between 1.0 and 1.10, preferably between 1.0 and 1.05.

As explained in the introduction, the biopolymers forming the middle layer are biosourced and/or biodegradable organic polymers. They are preferably biosourced.

Biosourced biopolymers are preferably selected from the group consisting of osides, proteins, and synthetic polymers obtained from biosourced monomers.

Osides encompass heterosides, the hydrolysis of which produces non-carbohydrate oses and compounds and holosides which are polymers exclusively of oses.

Mention may be made, by way of examples of osides usable to form the middle layer of the vapor barrier of the present invention, of those chosen from the group consisting of alginate, carrageenan, cellulose, in particular regenerated cellulose (cellulose hydrate), chitin, chitosan, pectin, dextrin, starch, curdlan, FucoPol, gellan gum, pullulan and xanthan.

The proteins are advantageously selected from the group consisting of gluten, soy protein isolate, zein, whey proteins, casein, collagen and gelatin.

Most of these biosourced polymers, extracted from biomass, have a high affinity for water and dissolve or swell in water to form hydrogels.

It may consequently be advantageous, or even necessary, to chemically modify them in order to reduce their hydrophilic nature, in particular to crosslink them in order to make them insoluble in water.

Mention may be made, as examples of chemically modified biosourced biopolymers, of cellulose esters, in particular cellulose acetate, cellulose ethers (in particular ethylcellulose, hydroxyethyl cellulose), nitrocellulose, starch esters and ethers.

The third category of biosourced biopolymers is formed by polymers synthesized from biosourced monomers.

These polymers may be linear or branched, and therefore thermoplastic, or thermoset.

Mention may be made, as examples of synthetic polymers obtained from biosourced monomers, of those selected from the group consisting of polyhydroxyalkanoates (PHA), in particular polyhydroxybutyrate (PHB) and poly(hydroxybutyrate-co-hydroxyvalerate) (PHBV), poly(lactic acid) (PLA), poly(glycolic acid) (PGA), poly(lactide-co-glycolide) (PLGA), the polymers obtained by polymerization of lipid monomers, and the thermoset polymers obtained by reaction of monosaccharides, disaccharides, oligosaccharides and/or alditols with a polycarboxylic acid and/or a polyaldehyde.

The thermoset polymers obtained by reaction of monosaccharides, disaccharides, oligosaccharides and/or alditols with a polycarboxylic acid and/or polyaldehyde are well known in the field of binders for mineral wool and are described in detail, for example in international applications WO2009/080938, WO2010/029266, WO2013/014399, WO2013/021112 and WO2015/132518 in the name of the Applicant.

As explained in the introduction, it is also possible to use polymers of petrochemical origin to form the middle layer of the membranes of the present invention when they are biodegradable within the meaning of the NF EN 13432 standard.

Biodegradable biopolymers may advantageously be selected from the group consisting of homopolymers of homopolymers such as poly(caprolactone) (PCL) and poly(butylene succinate) (PBS), aliphatic copolyesters such as and poly(butylene succinate-co-adipate), aromatic copolyesters such as poly(butylene adipate-co-terephthalate) (PBAT) and polyesteramides.

All the biopolymers constituting the middle layer have a permeability coefficient $P_1$, determined at 23° C. under dry conditions (about 25% average relative humidity), greater than or equal to 300 Barrers, preferably between 300 and 50,000 Barrers, in particular between 400 and 30,000 Barrers, and ideally between 500 and 20,000 Barrers.

This permeability coefficient is determined as follows:

Five samples of the same membrane of thickness (E) are sealed by means of a sealing product above test cups containing a desiccant ($CaCl_2$ powder imposing relative humidity in the cup of about 1%). A template is arranged on the surface of the films prior to the application of the sealing product, in order to create an exchange zone, free of any sealing product and of a defined zone (A). Various sealing products can be used. The sealing product is for example a mixture of 60% microcrystalline wax and 40% refined crystalline paraffin.

The cups thus produced are placed in a temperature-controlled test chamber (23° C.) and relative humidity (50%), also called a climate chamber.

Due to the difference in partial pressure of steam (dP) prevailing inside the test cups and in the chamber, steam migrates through the exchange zone of the membranes. Periodic weighings of the cups are carried out in order to determine the water vapor transmission flow rates (Q) in a steady state, then, by calculation, the water vapor permeability coefficient of the films considered, expressed in Barrers. The average of the permeability measured on the different assemblies is then calculated and corresponds to the aforementioned permeability coefficient $P_1$.

The hydrophilic middle layer of the vapor barrier membrane of the present invention is covered on its two faces with a continuous layer of an organic polymer that is more hydrophobic and less permeable to water vapor than the middle layer. The term "continuous" here means that each of the outer layers completely covers one of the faces of the median membrane so that it is not in contact with the atmosphere. The two continuous layers may be of the same chemical nature and of the same thickness, or else of a chemical nature and/or of different thickness from each other. Each of them is directly in contact with the middle layer.

The permeability coefficient $P_2$ of each of the outer layers is at most equal to 250 Barrers, preferably between 0.05 and 100 Barrers, in particular between 1.0 and 20 Barrers. The permeability coefficient is determined in the same way as the coefficient $P_1$.

The organic polymer constituting the outer layers is advantageously selected from the group consisting of polypropylene, polyethylene, poly(ethylene-co-propylene), homopolymers and copolymers of vinyl monomers selected from vinyl chloride, vinylidene chloride, vinyl fluoride, vinylidene fluoride, tetrafluoroethylene and acrylonitrile.

A vapor barrier membrane with a middle layer consisting of cellulose, in particular regenerated cellulose, and two outer layers made of polyethylene, polypropylene, an ethylene-propylene or poly(vinylidene chloride) copolymer, preferably poly(vinylidene chloride), is a particularly preferred embodiment of the vapor barrier membrane used in the method of the present invention.

The active portion of the vapor barrier membrane used in the method of the present invention advantageously has a thickness comprised between 5.0 μm and 240 μm, preferably between 10 μm and 120 μm, in particular between 15 and 80 μm, these values corresponding to the active portion (tri-layer) of the membrane, but does not encompass a possible reinforcing and/or protective structure.

Preferably, the wall or barrier of the room or wall of the building whose airtightness is to be improved are isolated, that is to say covered, by a thermal insulation material and the vapor barrier membrane is attached to the heat insulating material or incorporated in the heat insulating material. In one embodiment of the method for improving the airtightness of a building or room in a building, the vapor barrier membrane of the present invention consequently is applied in an internal position relative to the thermal insulation material, preferably in direct contact therewith. The attachment can be done by any suitable means that do not significantly reduce the airtightness of the membrane. It can be done for example by gluing, stapling or by means of a mechanical fastening system using hooks and textile loops (a hook-and-loop fastener of the Velcro® type).

In another embodiment of the method of the present invention, the vapor barrier membrane is integrated into the insulating material and attached to the wall of the room or building at the same time as the insulating material. The membrane is then oriented parallel to the two main surfaces of the insulating material and is preferably located closer to the main surface facing the inside of the room or building than to the main surface facing the wall.

The thermal insulation material may be any insulating material permeable to water vapor and notably encompasses foams and fiber-based materials. It is preferably made of mineral fibers (mineral wool) or of natural organic fibers (lignocellulosic fibers, cellulose wadding, animal wool), synthetic (polyester fibers) or artificial fibers. It is preferably made of mineral wool.

EXAMPLES

Five vapor barrier membranes were subjected to an evaluation of their permeability to water vapor under wet and dry conditions.

For this, each membrane has been positioned so as to close an aluminum cup using as a jointly product molten paraffin wax (mixture of 60% microcrystalline wax and 40% refined crystalline paraffin) to ensure sealing. To measure water vapor permeability in dry conditions, calcium chloride is introduced into the tower before sealing it with the membrane to impose relative humidity of about 1% inside. The cup/membrane assembly is then introduced into a climate chamber wherein the relative humidity is set at 50% and the temperature at 23° C., so as to create a water vapor differential pressure (dP) on either side of the membrane. The flow of water vapor (Q) which passes through the zone (A) of the membrane with thickness (E) is determined by weighing the cups over time, and the permeability coefficient (expressed in Barrers) is calculated using the formula $$P=(Q \times E)/(A \times dP)$$

The permeability coefficient $P_1$ thus calculated corresponds to an average relative humidity of 25.5% ((1%+50%)/2).

To measure the water vapor permeability under wet conditions (90% average relative humidity), the procedure is analogous, except that liquid water is introduced into the cup in order to set the relative humidity to 100%, and the relative humidity in the climate chamber is set at 80%.

The equivalent air layer thickness ($S_d$) is also determined for each membrane in accordance with EN ISO12572.

The first membrane is a vapor barrier membrane according to the invention. It consists of a middle layer of cellulose with a thickness of 17.5 μm sandwiched between two layers of polyvinylidene chloride (PVDC) with a thickness of 750 nm each. The permeability coefficient $P_1$ of the middle layer of cellulose is 5600 Barrers at a relative humidity of 25.5%

(23° C.) and 34600 Barrers at a relative humidity of 90% (23° C.); the permeability coefficient $P_2$ of the PVDC layers is 5 Barrers (23° C.). It does not vary depending on relative humidity.

The second and third membranes consist solely of cellulose and have the same permeability coefficients $P_1$ as the middle layer of the first membrane.

The fourth membrane is a membrane made up of a single active layer of polyamide 6 with a thickness of 40 μm attached to a polypropylene nonwoven. It is available on the market under the name Vario KM Duplex® (Saint-Gobain Isover)

The fifth membrane is a three-layer membrane according to the prior art, with an active portion consisting of a middle layer of ethylene vinyl alcohol copolymer (EVOH) sandwiched between two layers of polyamide 6, attached to a polypropylene nonwoven. This membrane is available on the market under the name Vario Xtra® (Saint-Gobain Isover).

The technical characteristics of the membranes (composition of the layers, thickness, equivalent air layer thickness under dry and wet conditions) are gathered in Table 1 below.

TABLE 1

| Membrane | | Total thickness | $S_d$ (25.5% RH) | $S_d$ (90% RH) |
|---|---|---|---|---|
| 1 (invention) | PVDC-cellulose-PVDC | 19 μm | 48 m | 0.12 m |
| 2 (comparative) | cellulose | 23 μm | 0.35 m | 0.04 m |
| 3 (comparative) | cellulose | 45 μm | 0.52 m | 0.05 m |
| 4 (comparative) | Polyamide (PA6) | 40 μm | 4 m | 0.14 m |
| 5 (comparative) | PA6-EVOH-PA6 | 30 μm | 24 m | 0.22 m |

It can be seen that the difference between the equivalent air layer thickness of the three-layer vapor barrier membrane according to the invention (membrane 1) under dry and wet conditions is significantly stronger than that of all the comparative membranes (membranes 2 to 5).

The two cellulose membranes (membranes 2 and 3) have an equivalent air layer thickness ($S_d$) less than 1 m, whether in wet or dry conditions. They are not suitable as vapor barrier membranes since their humidity-regulating power is insufficient. During the dry and cold season, these membranes would let too much water into the space between the membrane and the wall of the building. This insufficiently "smart" behavior is spectacularly corrected by the presence of the two thin PVDC layers.

It may also be noted that the membrane according to the invention (membrane 1) has a total thickness (19 μm) much lower than those of the active portions of the two membranes sold by the applicant, which are equal to 40 μm (VScenario KM Duplex®) and 30 μm (VScenario Xtra®), respectively. The excellent performance of the membrane according to the invention consequently makes it possible to reduce the raw materials and consequently the costs.

The invention claimed is:

1. A method for improving the airtightness of a building or room in a building comprising providing a vapor barrier membrane on an inner face of a wall of the building or the room in the building, wherein the vapor barrier membrane is a humidity-regulating membrane comprising an active portion comprising
   a middle layer having a thickness of 2 μm to 200 μm, and consisting of a biopolymer having a water vapor permeability coefficient $P_1$ which increases with average relative humidity and which, when determined at 23° C. and at an average relative humidity of 25.5%, is at least 300 Barrers, and, on either side of the middle layer, two outer layers with a thickness of 100 nm to 20 μm, and consisting, independently of each other, of an organic polymer having both a water vapor permeability coefficient $P_2$, determined at 23° C. and at an average relative humidity of 25.5%, of at most equal to 250 Barrers.

2. The method according to claim 1, wherein the water vapor permeability coefficient $P_2$ of the organic polymer constituting the outer layers does not vary significantly with the average relative humidity.

3. The method according to claim 1, wherein the biopolymer forming the middle layer is a biosourced biopolymer selected from the group consisting of osides, proteins and synthetic polymers obtained from biosourced monomers.

4. The method according to claim 3, wherein the osides are selected from the group consisting of alginate, carrageenan, cellulose, chitin, chitosan, pectin, dextrin, starch, curdlan, FucoPol, gellan gum, pullulan and xanthan.

5. The method according to claim 3, wherein the proteins are selected from the group consisting of gluten, soy protein isolate, zein, whey proteins, casein, collagen and gelatin.

6. The method according to claim 4, wherein the osides and proteins are chemically modified.

7. The method according to claim 3, wherein the synthetic polymers obtained from biosourced monomers are selected from the group consisting of polyhydroxyalkanoates (PHA), poly (lactic acid) (PLA), poly(glycolic acid) (PGA), poly (lactide-co-glycolide) (PLGA), the polymers obtained by polymerization of lipid monomers, thermoset polymers obtained by reaction of monosaccharides, disaccharides, oligosaccharides and/or alditols with a polycarboxylic acid and/or a polyaldehyde.

8. The method according to claim 1, wherein the biopolymer is a biodegradable polymer selected from the group consisting of an aliphatic polyester, an aliphatic copolyester, an aromatic copolyester and a polyesteramide.

9. The method according to claim 8, wherein the biodegradable biopolymers are selected from the group consisting of poly(caprolactone) (PCL), poly(butylene succinate) (PBS), poly(butylene succinate-co-adipate), and poly(butylene adipate-co-terephthalate) (PBAT).

10. The method according to claim 1, wherein the organic polymer constituting the outer layers is selected from the group consisting of polypropylene, polyethylene, poly(ethylene-co-propylene), homopolymers and copolymers of vinyl monomers selected from vinyl chloride, vinylidene chloride, vinyl fluoride, vinylidene fluoride, tetrafluoroethylene and acrylonitrile.

11. The method according to claim 1, wherein the middle layer consists of cellulose and the two outer layers consist of polyethylene, polypropylene, an ethylene-propylene copolymer or poly(vinylidene chloride).

12. The method according to claim 1, wherein the active portion of the membrane has a thickness comprised between 5.0 μm and 240 μm.

13. The method according to claim 1, wherein the vapor barrier membrane further comprises a reinforcing or protective layer which is in contact with one of the outer layers of the active portion.

14. The method according to claim 1, wherein the wall of the building or of the room in the building is covered by a thermal insulation material and the vapor barrier membrane is applied in an internal position relative to the thermal insulation material or that the membrane is integrated into the thermal insulation material.

15. The method according to claim 14, wherein the thermal insulation material is made of mineral or organic, natural, synthetic or artificial fibers.

16. The method according to claim 1, wherein the middle layer has a thickness of 4 μm to 100 μm.

17. The method according to claim 1, wherein the thickness of the outer layers is from 100 nm to 20 μm.

18. The method according to claim 1, wherein the water vapor permeability coefficient $P_2$ is between 0.05 and 100 Barrers.

19. The method according to claim 18, wherein the water vapor permeability coefficient $P_2$ is between 1.0 and 20 Barrers.

20. The method according to claim 1, wherein the two outer layers are in contact with the middle layer.

21. The method according to claim 1, wherein the middle layer and the two outer layers are non-perforated continuous layers.

* * * * *